(12) United States Patent
Forest et al.

(10) Patent No.: US 7,138,998 B2
(45) Date of Patent: Nov. 21, 2006

(54) MULTI-RESOLUTION SPATIAL PARTITIONING

(75) Inventors: Charles M. Forest, Portland, OR (US); Oliver A. Heim, Portland, OR (US); Sanjeev N. Trika, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 457 days.

(21) Appl. No.: 10/295,234

(22) Filed: Nov. 14, 2002

(65) Prior Publication Data
US 2004/0095343 A1 May 20, 2004

(51) Int. Cl.
*G06T 15/00* (2006.01)

(52) U.S. Cl. ..................................... 345/423

(58) Field of Classification Search ............... 345/419, 345/420, 473, 423, 424, 427, 428
See application file for complete search history.

(56) References Cited

U.S. PATENT DOCUMENTS 6,606,095 B1 * 8/2003 Lengyel et al. ............ 345/473

OTHER PUBLICATIONS

Hoppe, "Smooth View-Dependent Level-of-Detail Control and its Application to Terrain Rendering", 1998, IEEE, pp. 35-42 and 516.*

Eberly, David H.; "3D Game Design: A Practical Approach to Real-Time Computer Graphics," 2001, pp. 412-413, Academic Press, San Diego, CA, USA.
Gueziec et al., "Simplicial Maps for Progressive Transmission of Polygonal Surfaces," VRML 98, 1998, pp. 25-32, Monterey, CA, USA.
Hoppe, Hugues; "Progressive Meshes," ACM SIGGRAPH 1996, pp. 99-108, http://research.microsoft.com/~hoppe/pm.pdf, Nov. 2002.
Watt, Alan; "3D Computer Graphics," 2nd Edition, 1993, p. 43, Addison-Wesley, Harlow, England.

* cited by examiner

*Primary Examiner*—Almis R. Jankus
(74) *Attorney, Agent, or Firm*—Steven P. Skabrat

(57) ABSTRACT

Updating a spatial partitioning data structure during run-time in an efficient manner includes several pre-processing steps. Pre-processing includes generating a first spatial partitioning data structure for a model at a first resolution, generating a second spatial partitioning data structure for the model at a second resolution, analyzing the first and second spatial partitioning data structures to identify differences between spatial partitioning of the model at the first and second resolutions, and storing the differences in a spatial partitioning update data structure. This pre-processing may be repeated for one or more pairs of successive resolutions of the model. Subsequently, during run-time, the model's resolution may be changed from the first resolution to the second resolution. In response, a spatial partitioning data structure corresponding to the first resolution may be updated using the spatial partitioning update data structure to reflect the change in resolution of the model.

26 Claims, 6 Drawing Sheets

SPATIAL PARTITIONING DATA STRUCTURE

| CELL | HAS VERTICES | OVERLAPS VERTICES |
|---|---|---|
| (0, 0) | V6 | V5V6, V6V7 |
| (0, 1) | V5, V4 | V4V5, V5V6, V3V4 |
| (0, 2) | - | V3V4 |
| (1, 0) | - | V6V7 |
| (1, 1) | V2 | V2V3, V1V2 |
| (1, 2) | V3 | V2V3, V3V4, V1V2 |
| (2, 0) | V3 | V6V7, V7V1 |
| (2, 1) | - | V6V7 |
| (2, 2) | V1 | V7V1, V1V2 |

SPATIAL PARTITIONING DATA STRUCTURE 46

| CELL | HAS VERTICES | OVERLAPS VERTICES |
|---|---|---|
| (0, 0) | V6 | V4V6, V6V7 |
| (0, 1) | V4 | V4V6, V3V4 |
| (0, 2) | - | V3V4 |
| (1, 0) | - | V6V7 |
| (1, 1) | V2 | V2V3, V1V2 |
| (1, 2) | V3 | V2V3, V3V4, V1V2 |
| (2, 0) | V3 | V6V7, V7V1 |
| (2, 1) | - | V6V7 |
| (2, 2) | V1 | V7V1, V1V2 |

MULTI-RESOLUTION SPATIAL PARTITIONING

BACKGROUND

1. Field

The present invention relates generally to computer graphics and, more specifically, to spatial partitioning of three-dimensional (3D) models.

2. Description

Multi-resolution geometric models (two-dimensional (2D) or 3D geometries) provide a way to efficiently change a model's resolution during run-time. A multi-resolution model is typically represented as a polygonal mesh. The polygons are usually triangles, and the mesh defines a plurality of triangles by specifying connecting vertices and edges. Multi-resolution models have several important applications, for example, reducing the processor usage for rendering objects at a distance without losing visual quality, application of key computational geometry algorithms at lower model resolutions, and streaming of models over the Internet. Multi-resolution is especially important for large models. Such models in common applications also typically have spatial partitioning data structures associated with them.

In 2D and 3D computer graphics, spatial partitioning typically includes the action of dividing up a space into smaller portions. The space may represent a scene in a world. The portions are sometimes called octants (for 3D), quadrants (for 2D), or gridlets (for 2D or 3D). Subdividing space is usually done during graphics pipeline processing to minimize future computation and to minimize the number of objects sent down the graphics pipeline. For example, if some objects in the scene are not currently visible based on the current camera position, then there is no need to further process these objects. Instead of examining each object submitted into the pipeline, when using spatial partitioning, graphics processing examines only the octants actually containing objects of the scene. For example, entire octants may be removed from further processing consideration if they are outside of the currently visible region of the scene, thus saving the time of transforming, rendering, and rasterizing the polygons of the objects contained in the non-visible octants.

Once a scene is partitioned and all objects in the scene are identified for a particular portion of the space, the results are typically stored in a spatial partitioning (SP) data structure for subsequent use by graphics processing components (such as a video game engine or an animation generator, for example). The SP data structure is usually generated after scene creation, but before scene visualization and user interaction with the scene (i.e., run-time). Typically, the SP data structure takes equal to or greater than O(n) time to construct, where n is the number of vertices in the model. During scene visualization, it may be necessary to find an object in the scene corresponding to a selected point. Given a point in 2D coordinates (e.g., x, y) or 3D coordinates (e.g., x, y, z), the SP data structure is typically traversed to find information about the object containing the point.

There are at least several existing techniques and corresponding data structures for spatial partitioning. These include uniform grids (also called regular grids), binary space partitioning (BSP) trees, octrees, and k-d trees.

A uniform grid is the simplest spatial partitioning scheme. A grid is uniformly subdivided and superimposed onto the scene. For example, if the space is 10 units by 10 units by 10 units, the space could be partitioned into 1 unit by 1 unit by 1 unit cubes (e.g., octants). Each cube may include zero or more polygons. A BSP tree is a data structure used when recursively dividing space into pairs of subspaces, each separated by a plane of arbitrary orientation and position. Partitions usually focus on polygons of static objects in the scene. Non-uniform partitioning is accomplished by positioning partition planes depending on where objects are located.

An octree is a data structure similar to a binary tree, but having a greater number of child nodes per parent node. Whereas a binary tree node typically has two child nodes (e.g., left and right children), an octree node has a specified number of child nodes (such as eight). Each node of the octree represents an octant of the scene. Each octant is sub-divided into a number of sub-octants (e.g., eight). Each node of the data structure contains pointers to the octants contained inside (e.g., a parent node points to child nodes). For 2D scenes, the tree is called a quadtree. For 3D scenes, the tree is a called an octree. Finer subdivision is performed in densely populated areas. If no objects are in an octant, then the octant is not subdivided further. An octree may be uniformly or non-uniformly subdivided, depending on the spatial partitioning algorithm used. The octree hierarchically partitions space up to a specified depth. An octree typically takes O(n log n) time to construct.

A k-d tree is a generalization of a binary tree where k is the dimension of the tree and d stands for dimension. For spatial partitioning, a k-d tree may be used to divide space. For example, each division of space denotes which side of a line (in 2D) or a plane (in 3D) an object may be on. Each time the left side of a line (or plane) or below a line (or plane) is considered, a left node of the k-d tree is examined. Each time the right side (or plane) or above a line (or plane) is considered, a right node of the k-d tree is examined. This process may be continued until a predetermined depth of the k-d tree is reached.

Regardless of which spatial partitioning scheme is used in a graphics application, a multi-resolution model's spatial partitioning must be recomputed every time a model's resolution changes during run-time. This can be a very expensive operation in a graphics processing system. A better multi-resolution representation and method of updating the representation are desired that minimize this computational expense.

BRIEF DESCRIPTION OF THE DRAWINGS

The features and advantages of the present invention will become apparent from the following detailed description of the present invention in which.

DETAILED DESCRIPTION

An embodiment of the present invention is a simple and efficient multi-resolution representation of spatial partitioning (SP) data structures. Using this representation and the associated algorithm described herein, embodiments of the present invention enable updating the SP data structures without having to entirely re-compute them whenever a model's resolution changes. This leads to performance gains and processor scalability for applications such as collision detection, rasterization or ray-tracing based rendering, convex hull generation, and occlusion culling.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

While embodiments of the present invention are applicable to both 2D and 3D geometries in any representation (e.g., polygons, indexed meshes, constructive solid geometry (CSG) models, etc.), and to any SP data structure (e.g., uniform grids, BSP trees, octrees, k-d trees, etc.), described herein are embodiments of the invention using an example of a 2D polygon with uniform grid spatial partitioning. The application of the present invention to other dimensions, other model representations, and other SP techniques and data structures will be apparent to those skilled in the art without undue experimentation.

Figure 1:
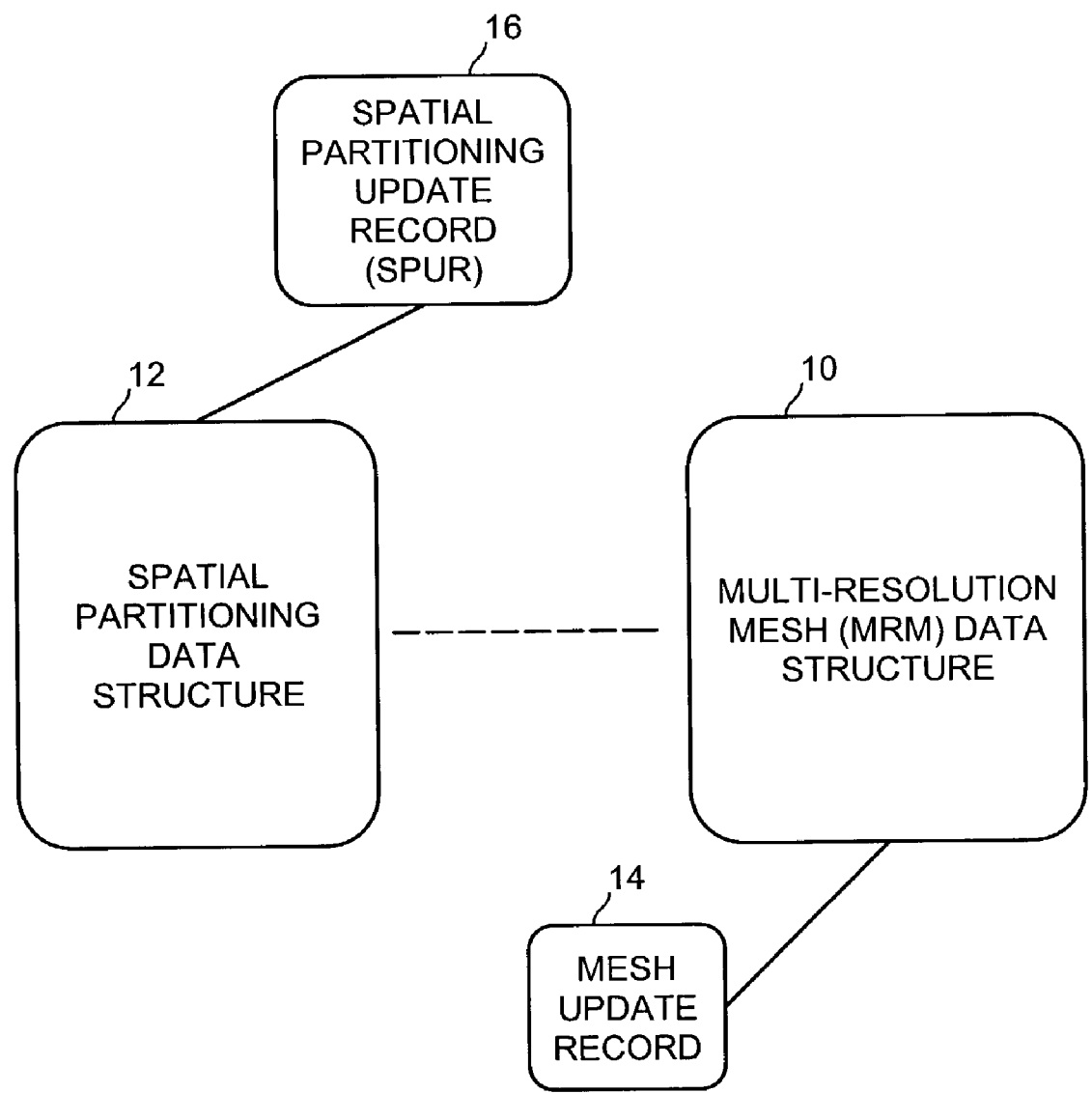
FIG. 1 is a diagram of multi-resolution mesh and spatial partitioning data structures according to an embodiment of the present invention.

FIG. 1 is a diagram of multi-resolution mesh (MRM) and spatial partitioning data structures according to an embodiment of the present invention. A MRM data structure 10 stores information defining a model. That is, the MRM data structure includes information about vertices, edges, and possibly other information, such as details about the model's surfaces, for example. Many different implementations of a MRM data structure may be used within the scope of the present invention. A SP data structure 12 stores information about the spatial partitioning of the MRM at a given resolution. Thus, the SP data structure corresponds to the MRM data structure at the given resolution. When the MRM data structure changes due to a change in resolution of the model, the SP data structure must also change. In the prior art, the SP data structure was entirely regenerated when the model's resolution changed. In embodiments of the present invention, the SP data structure may be represented in such a way as to support the change in the model's resolution with minimal processing to the SP data structure being necessary. As described herein, a spatial partitioning update record (SPUR) 16 may be used to efficiently update the SP data structure 12.

Multi-resolution algorithms typically work by employing two stages: a pre-processing stage, and a run-time stage. In the pre-processing stage, the model is stored as MRM data structure 10, the model is analyzed, and a sequence of mesh update records 14 are computed and stored. Each mesh update record specifies exactly how the model's resolution should change for a resolution step. For example, in FIG. 2 a first resolution of a model 30 is shown. This model is defined by the vertices V1, V2, . . . V7, and the edges V1V2, V2V3, V3V4, V4V5, V5V6, V6V7, and V7V1. An example mesh update record 32 specifies that the model's resolution may be decreased from seven vertices to six vertices by removing vertex V5, removing edge V5V6, removing edge V4V5, and adding edge V4V6. This would result in a second resolution of model 34 as shown. The model now only has vertices V1, V2, V3, V4, V6, and V7. The mesh update record 32 may also specify that the model's resolution may be changed back to the first resolution (e.g., from six vertices back to seven vertices) by reversing the sequence. In this example, the model at the second resolution needs to have edge V4V6 removed, vertex V5 added, edge V5V6 added, and edge V4V5 added, in order to change the model's resolution back to the first resolution. Larger resolution changes may be achieved by stepping the resolution changing algorithm multiple times through single resolution changes. At the run-time stage, the mesh update record is used to effect the change in resolution by editing the model according to the mesh update record directives. The model's resolution may need to be changed due to user input or other dynamic interactions in an application program.

Spatial partitioning breaks up a model into a set of primitives (e.g., edges, vertices, triangles) based on their spatial location within a chosen bounding space. A SP representation may be created during a pre-processing stage. Every SP representation consists of cells that cover the represented space. Each cell maintains the set of model primitives that overlap the cell. FIG. 3 is an example of spatial partitioning using a uniform grid 40 and a spatial partitioning data structure 42 prior to a change in resolution according to an embodiment of the present invention. In this example, a uniform grid 40 partitions the model 30 of FIG. 2. In this example, the chosen bounding space is a loose bounding box of the model, and the chosen primitives are edges and vertices. Thus, each grid cell has a list of overlapping edges and vertices. This information may be stored in SP data structure 42 as shown.

Figure 2:
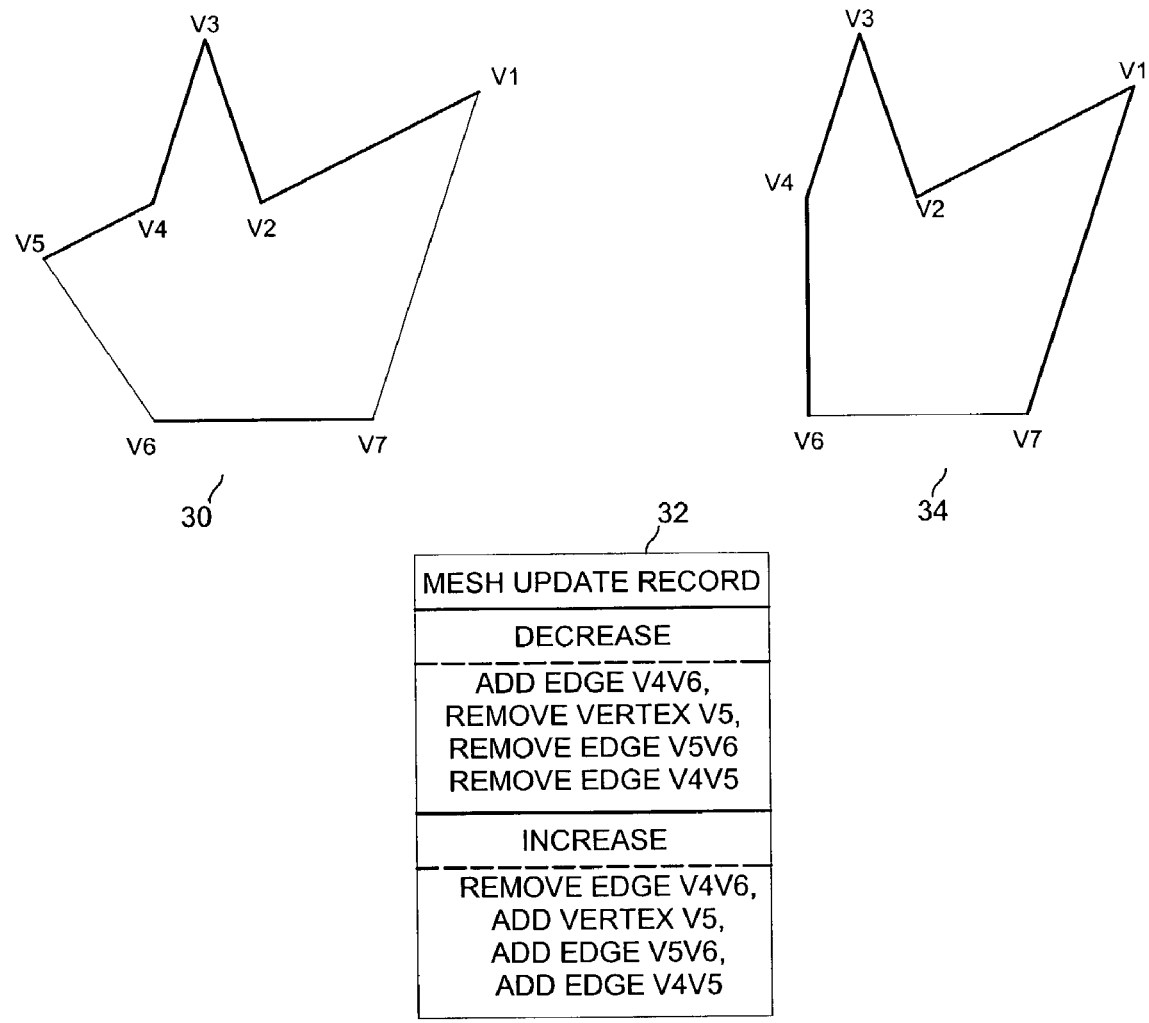
FIG. 2 is an example of a simple multi-resolution mesh and associated mesh update record.
Figure 3:
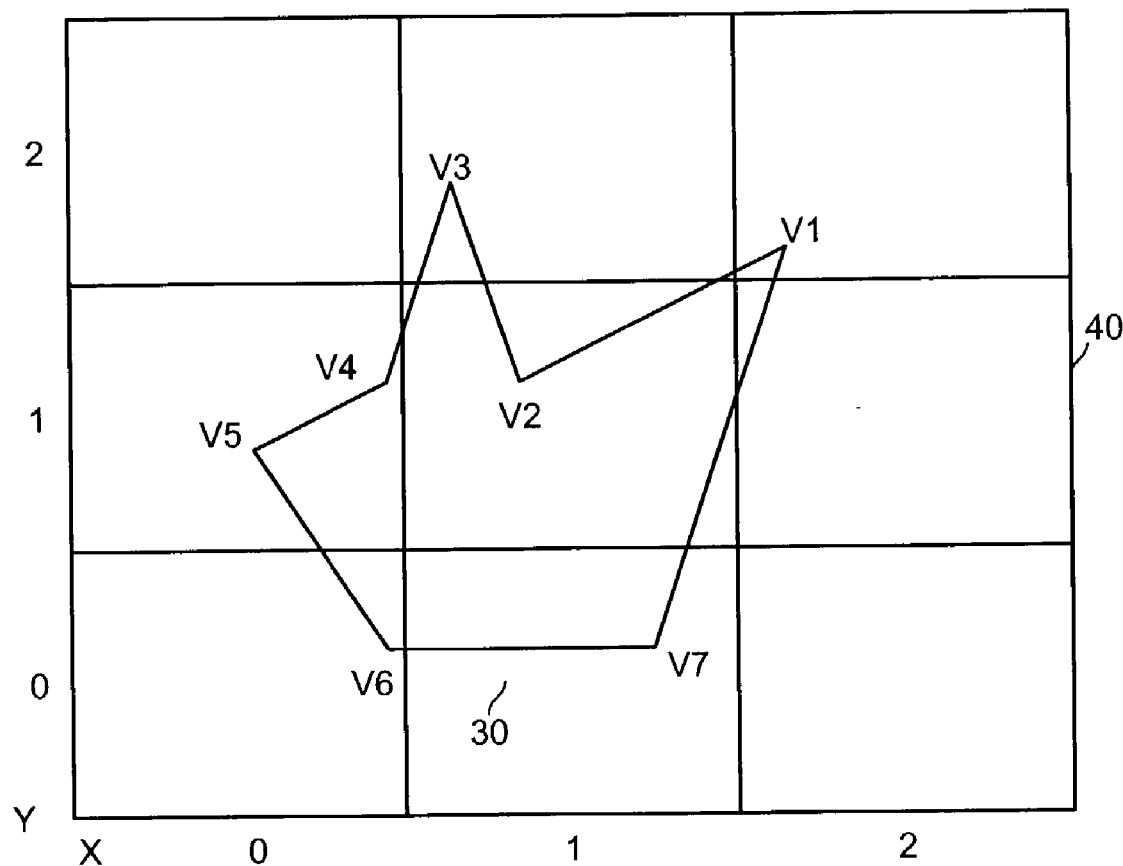
FIG. 3 is an example of spatial partitioning using a uniform grid and a spatial partitioning data structure prior to a change in resolution according to an embodiment of the present invention.

In the context of the examples of FIGS. 2 and 3, a problem occurs when the resolution of the model 30 changes from seven vertices to six vertices during run-time. When the resolution of the model is changed during run-time, the associated SP data structure 42 becomes invalid and unusable because it no longer corresponds to the model at the changed resolution (i.e., model 34). Prior art systems reconstruct the SP data structure to match the model at the changed resolution. This is computationally very expensive and may be prohibitively time consuming depending on the application. It is also impractical to pre-compute and store a SP data structure for each model resolution because of the storage requirements and memory re-allocations required at run-time.

To solve this problem, embodiments of the present invention pre-process the model and the spatial partitioning to compute and store information about how to update the SP data structure whenever the model resolution changes. This information is stored in an SP update record (SPUR) 16. Each SPUR stores how to change the SP data structure during run-time for an incremental change in resolution of the model. At run-time, the SP data structure may be updated dynamically for one incremental change in resolution in $O(1)$*time to match the corresponding change in resolution of the underlying model. This requires only one table lookup operation to identify the required changes, and a small (typically bound) number of local SP data structure updates. This assumes that the SP data structure is implemented in a manner in which primitive insertions and deletions may be done from a SP cell in $O(1)$ time. The run-time complexity is $O(R)$ for changes in model resolution by R vertices.

During the preprocessing phase, the MRM algorithm must make intelligent edge collapse choices so that the updating of the SPUR will take only O(1) time. In some embodiments, there may be added restrictions on MRM, because there may be numerous choices good for MRM edge collapses that might not result in an O(1) update time for the SPUR.

Figure 4:
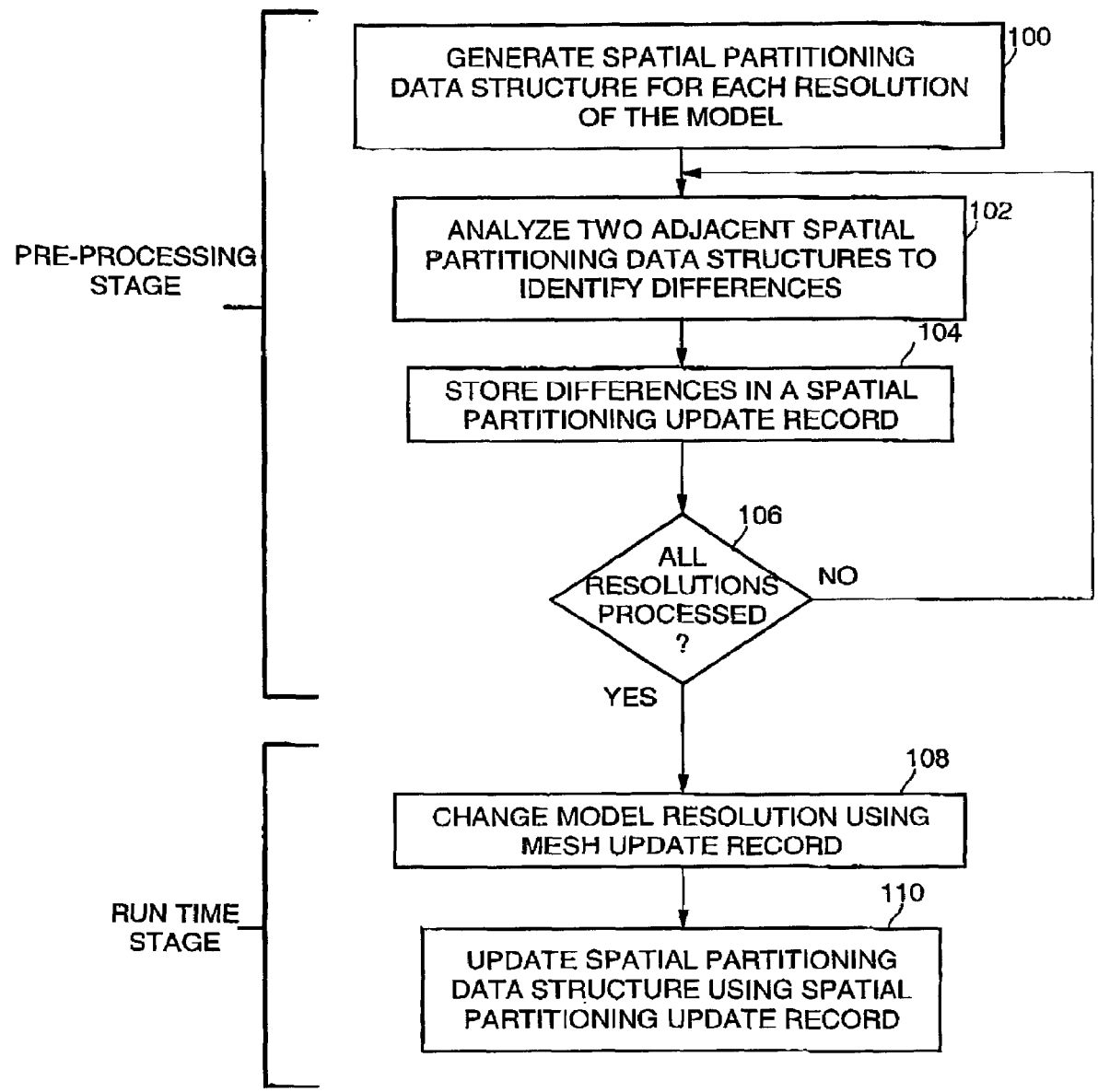
FIG. 4 is a flow diagram illustrating multi-resolution spatial partitioning processing according to an embodiment of the present invention.
Figure 5:
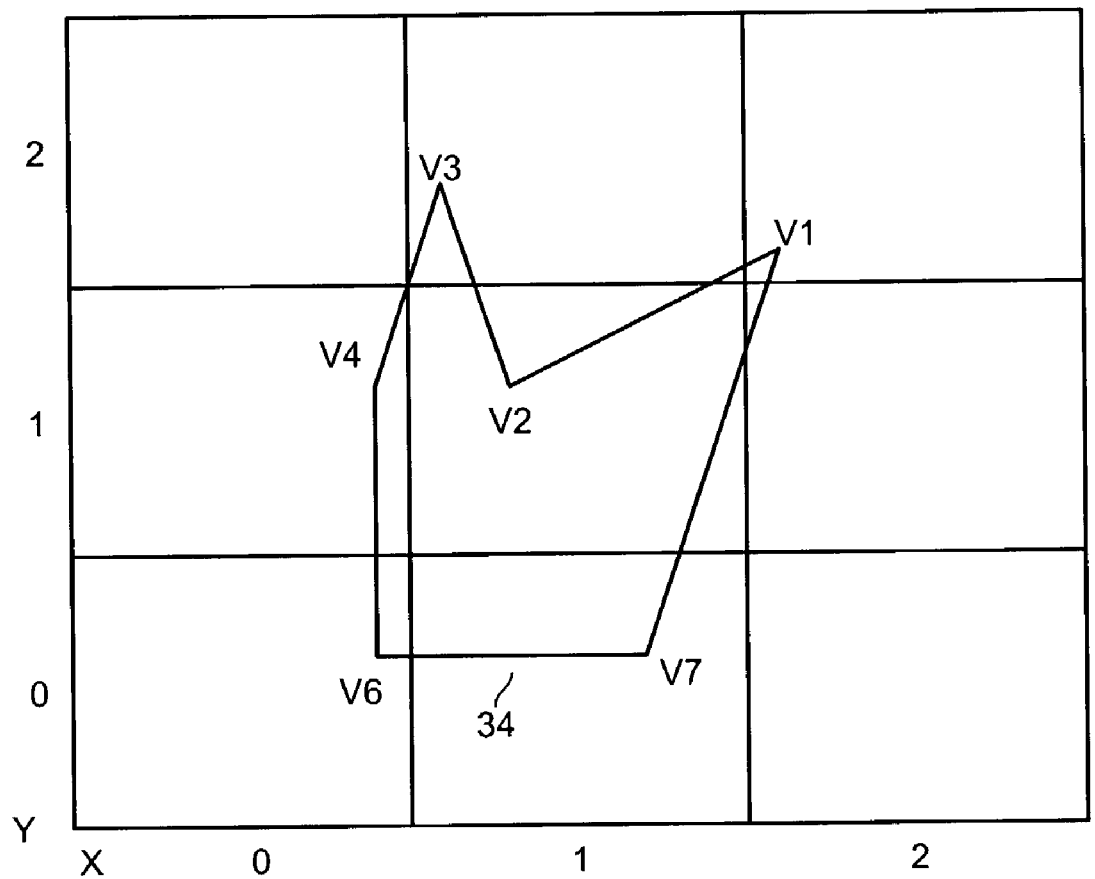
FIG. 5 is an example of spatial partitioning using a uniform grid and a spatial partitioning data structure after a change in resolution according to an embodiment of the present invention.

Embodiments of the invention involve two stages, a pre-processing stage and a run-time stage. FIG. 4 is a flow diagram illustrating multi-resolution spatial partitioning processing according to an embodiment of the present invention. During the pre-processing stage, the following operations may be performed. At block 100, a SP data structure may be generated for each resolution of the model. For example, FIG. 3 shows SP data structure 42 describing the spatial partitioning of model 30. FIG. 5 shows spatial partitioning using a uniform grid and a SP data structure 46 corresponding to model 34 (after a change in resolution of model 30). At block 102, two adjacent SP data structures may be analyzed to identify differences between them. As used herein, the term "adjacent" refers to a pair of successive models wherein each model of the pair is related to the other by a change in resolution. Similarly, the term "adjacent" refers to a pair of successive SP data structures wherein each SP data structure of the pair is related to each other by a change in resolution of the model. In one embodiment, the change in resolution may be adding or deleting one vertex from the model. In other embodiments, other numbers of vertices being added or deleted from the model may comprise a change in resolution. For example, as shown in FIGS. 3 and 5, the SP data structures 42 and 46 may be compared to determine the differences between the lists of vertices and edges.

Figure 6:
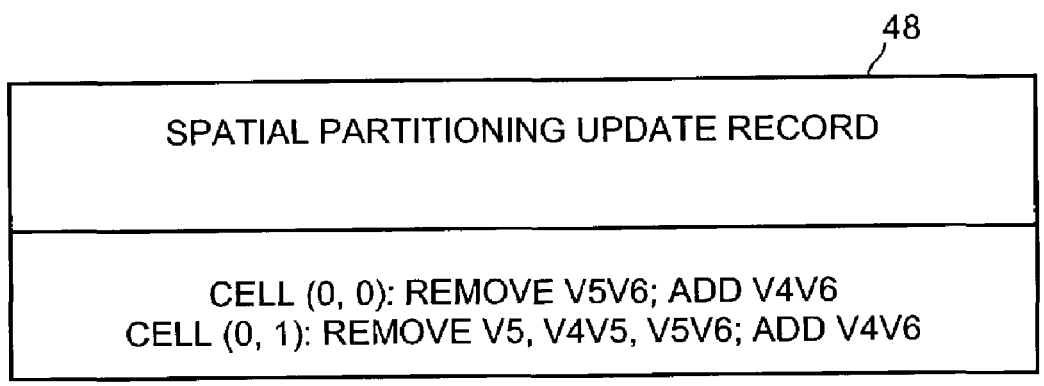
FIG. 6 is a diagram illustrating a spatial partitioning update record for the examples of FIGS. 3 and 5 according to an embodiment of the present invention.

At block 104, the differences between two SP data structures may be stored in a SPUR. FIG. 6 is a diagram illustrating a spatial partitioning update record (SPUR) 48 for the examples of FIGS. 3 and 5 according to an embodiment of the present invention. In this example, SPUR 48 identifies the differences between the SP data structures 42 and 46 as occurring in cell (0, 0) ("remove V5V6, add V4V6"), and cell (0, 1) ("remove V5, V4V5, V5V6, add V4V6") of the uniform grid. These differences are essentially directives on how to change the SP data structure to reflect the associated change in resolution of the model. At block 106, if all resolutions of the model have been processed, pre-processing of the SP data structures is done. If all resolutions of the model have not been processed, then processing continues with block 102, wherein another two adjacent SP data structures corresponding to two resolutions of the model may be analyzed. When all resolutions of the model have been processed, a plurality of SPURs have been created, each SPUR to be used for updating the SP data structure and corresponding to a mesh update record for changing the resolution of the model from a first resolution to a second resolution during run-time. In processing all resolutions, analysis of each successive pair of spatial partitioning data structures (representing successive pairs of model resolutions in the sequence of changing resolutions) is done to produce the spatial partitioning update records. Once all spatial partitioning update records have been generated, the SP data structures may be discarded.

During the run-time stage, a model's resolution may be changed using a mesh update record at block 108. If the change in resolution of the model is only one increment, one mesh update record may be used. If the change in resolution is multiple increments, then multiple associated mesh update records may be used. At block 110, the SP data structure corresponding to the model before the resolution change may be updated using the associated SPUR. If the change in resolution of the model is in multiple increments, then multiple SPURs may be used in sequence. The update may be performed by implementing the directives contained in the SPURs. The updated SP data structure then corresponds with the updated model. The SPUR may be used to change the SP data structure to correspond to either an increase or a decrease in model resolution.

Typically, common graphics applications use either a multi-resolution model or a SP data structure corresponding to a model to improve processing performance. These applications do not apply the technologies of multi-resolution models and spatial partitioning together because changes in model resolution invalidate the SP data structure, and computing the SP data structure anew is expensive. Embodiments of the present invention enable simultaneous application of the two technologies since the present invention provides a mechanism to update a model's SP data structure very efficiently at run-time.

The present invention may be used in several applications in computer graphics. Currently, collision detection algorithms use a lower resolution static mesh as the base for the SP data structure or these algorithms rebuild the SP data structure each frame. Embodiments of the present invention enable a multi-resolution SP data structure, computed only once, to ensure correct collision detection consistent with every model resolution. Ray tracing applications currently do not modify the SP data structures or change the model resolution. Instead, the SP data structure is built for a model at high resolution. Shooting fewer rays at the model is the prior art technique to reduce detail. Embodiments of the present invention offer a practical method to change the SP data structure to match the detail that will be rendered on a display. Details that would not be resolved could be removed from the model, and accordingly, the SP data structure may be simplified to save memory and traversal time.

In prior art streaming applications, acceleration data structures are computed on a client system as an application begins. A streaming solution is thus impossible, as all of the data needs to be received before physical simulation can begin. Embodiments of the present invention provide an incremental method to build a tree-based acceleration data structure in a streaming application. Efficient collision detection and ray-tracing is now possible on partially streamed geometry.

One prior art geometry compression technology is based on encoding a stream of mesh update records. Because the mesh update records are local operations on a mesh, the introduced vertices, texture coordinates and normals can be estimated from the nearby values on the mesh. Arithmetic encoding is then used to compress the differences between the estimated and actual values. Embodiments of the present invention allow acceleration data structures to be built from information contained in SPURs. Compressing the SPURs results in a compression scheme for SP data structures.

In sum, embodiments of the present invention propose a representation and algorithm for a new application: multi-resolution spatial partitioning.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that cause the machine to perform any one of the methods described herein. The terms "machine readable medium" and "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method of updating a spatial partitioning data structure comprising:
    generating a first spatial partitioning data structure for a model at a first resolution;
    generating a second spatial partitioning data structure for the model at a second resolution;
    analyzing the first and second spatial partitioning data structures to identify differences between spatial partitioning of the model at the first and second resolutions;
    storing the differences in a spatial partitioning update data structure; and
    dynamically updating the spatial partitioning update data structure at run time for one incremental change in resolution in a computational complexity of O(1) time.

2. The method of claim 1, wherein the first and second resolutions comprise adjacent model resolutions and the first and second spatial partitioning data structures are adjacent.

3. The method of claim 2, further comprising repeating the analyzing and storing for all successive pairs of adjacent model resolutions.

4. The method of claim 1, further comprising changing the model's resolution from the first resolution to the second resolution.

5. The method of claim 4, further comprising updating the first spatial partitioning data structure using the spatial partitioning update data structure.

6. The method of claim 5, further comprising changing the first spatial partitioning data structure according to directives included in the spatial partitioning update data structure.

7. An article comprising: a storage medium having a plurality of machine accessible instructions, wherein when the instructions are executed by a processor, the instructions provide for updating a spatial partitioning data structure by
    generating a first spatial partitioning data structure for a model at a first resolution;
    generating a second spatial partitioning data structure for the model at a second resolution;
    analyzing the first and second spatial partitioning data structures to identify differences between spatial partitioning of the model at the first and second resolutions;
    storing the differences in a spatial partitioning update data structure; and
    dynamically updating the spatial partitioning update data structure at run time for one incremental change in resolution in a computational complexity of O(1) time.

8. The article of claim 7, wherein the first and second resolutions comprise adjacent model resolutions and the first and second spatial partitioning data structures are adjacent.

9. The article of claim 8, further comprising instructions for repeating the analyzing and storing for all successive pairs of adjacent model resolutions.

10. The article of claim 7, further comprising instructions for changing the model's resolution from the first resolution to the second resolution.

11. The article of claim 10, further comprising instructions for updating the first spatial partitioning data structure using the spatial partitioning update data structure.

12. The article of claim 11, further comprising instructions for changing the first spatial partitioning data structure according to directives included in the spatial partitioning update data structure.

13. A method of multi-resolution spatial partitioning comprising:
    generating a spatial partitioning data structure for each resolution of a multi-resolution model,
    analyzing a successive pair of spatial partitioning data structures to identify differences between spatial partitioning of the model at adjacent resolutions;
    storing the differences in a spatial partitioning update data structure;
    repeating the analyzing and storing for all successive pairs of adjacent model resolutions;
    changing the model's resolution from a first resolution to a second resolution;
    dynamically updating the spatial partitioning update data structure at run time for one incremental change in resolution in a computational complexity of O(1) time; and updating a spatial partitioning data structure associated with the model at the first resolution using the spatial partitioning update data structure associated with first resolution.

14. The method of claim 13, wherein the generating, analyzing, storing and repeating are performed during a pre-processing stage.

15. The method of claim 13, wherein the changing and updating are performed during a run-time stage.

16. The method of claim 13, wherein changing the model's resolution comprises adding at least one vertex to the model.

17. The method of claim 13, wherein changing the model's resolution comprises deleting at least one vertex from the model.

18. An article comprising: a storage medium having a plurality of machine accessible instructions, wherein when the instructions are executed by a processor, the instructions provide for multi-resolution spatial partitioning by
generating a spatial partitioning data structure for each resolution of a multi-resolution model;
analyzing a successive pair of spatial partitioning data structures to identify differences between spatial partitioning of the model at adjacent resolutions;
storing the differences in a spatial partitioning update data structure,
repeating the analyzing and storing for all successive pairs of adjacent model resolutions;
changing the model's resolution from a first resolution to a second resolution;
dynamically updating the spatial partitioning update data structure at run time
for one incremental change in resolution in a computational complexity of O(1) time; and
updating a spatial partitioning data structure associated with the model at the first resolution using the spatial partitioning update data structure associated with first resolution.

19. The article of claim 18, wherein the generating, analyzing, storing and repeating are performed during a pre-processing stage.

20. The article of claim 18, wherein the changing and updating are performed during a run-time stage.

21. The article of claim 18, wherein instructions for changing the model's resolution comprise instructions for adding at least one vertex to the model.

22. The article of claim 18, wherein instructions for changing the model's resolution comprise instructions for deleting at least one vertex from the model.

23. The method of claim 6, wherein the directives comprise directives to update the first spatial partitioning data structure that partitions space in three dimensions when a level of detail is changed in a progressive mesh representing a surface.

24. The article of claim 12, wherein the directives comprise directives to update the first spatial partitioning data structure that partitions space in three dimensions when a level of detail is changed in a progressive mesh representing a surface.

25. The method of claim 13, wherein the spatial partitioning update data structure comprises directives to update a spatial partitioning data structure that partitions space in three dimensions when a level of detail is changed in a progressive mesh representing a surface.

26. The article of claim 18, wherein the spatial partitioning update data structure comprises directives to update a spatial partitioning data structure that partitions space in three dimensions when a level of detail is changed in a progressive mesh representing a surface.

* * * * *